(12) United States Patent
Jeong et al.

(10) Patent No.: US 11,780,965 B2
(45) Date of Patent: Oct. 10, 2023

(54) POLYAMIDE-IMIDE FILM AND PREPARATION METHOD THEREOF

(71) Applicant: SK microworks Co., Ltd., Gyeonggi-do (KR)

(72) Inventors: Dawoo Jeong, Gyeonggi-do (KR); Sunhwan Kim, Incheon (KR); Dae Seong Oh, Seoul (KR); Jin Woo Lee, Gyeonggi-do (KR); Dong Jin Lim, Gyeonggi-do (KR)

(73) Assignee: SK microworks Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/667,225

(22) Filed: Feb. 8, 2022

(65) Prior Publication Data
US 2022/0162388 A1    May 26, 2022

Related U.S. Application Data

(62) Division of application No. 16/262,472, filed on Jan. 30, 2019, now abandoned.

(30) Foreign Application Priority Data

Jan. 31, 2018    (KR) .................. 10-2018-0011753

(51) Int. Cl.
| | | |
|---|---|---|
| *C08G 73/14* | (2006.01) | |
| *C08J 5/18* | (2006.01) | |
| *C08G 73/10* | (2006.01) | |
| *B29C 39/00* | (2006.01) | |
| *B29C 39/14* | (2006.01) | |
| *B29C 39/38* | (2006.01) | |
| *B29K 79/00* | (2006.01) | |
| *B29L 7/00* | (2006.01) | |

(52) U.S. Cl.
CPC ............ *C08G 73/14* (2013.01); *B29C 39/003* (2013.01); *B29C 39/14* (2013.01); *B29C 39/38* (2013.01); *C08G 73/1032* (2013.01); *C08J 5/18* (2013.01); *B29K 2079/085* (2013.01); *B29L 2007/008* (2013.01); *C08J 2379/08* (2013.01)

(58) Field of Classification Search
CPC ... C08J 2379/08; C08J 2479/08; C08L 79/08; C08G 73/14
See application file for complete search history.

(56) References Cited

U.S. PATENT DOCUMENTS

2016/0185926 A1*    6/2016    Song .............. C08J 7/0427
428/447

FOREIGN PATENT DOCUMENTS

| CN | 103756317 | * | 4/2014 |
| JP | 2007313659 | * | 12/2007 |
| WO | WO 2016152459 | * | 9/2016 |

* cited by examiner

*Primary Examiner* — Gregory Listvoyb
(74) *Attorney, Agent, or Firm* — IP & T GROUP LLP

(57) ABSTRACT

Embodiments relate to a polyamide-imide film that secures excellent tensile toughness and elastic restoring force, and a process for preparing the same. The polyamide-imide film comprises a polyamide-imide polymer formed by polymerizing a diamine compound, a dianhydride compound, and a dicarbonyl compound, wherein the area value up to the yield point derived by the 0.2% off-set method on a stress-strain curve of the polyamide-imide film as measured using a universal testing machine (UTM) is 80 to 150 J/m$^2$.

13 Claims, 4 Drawing Sheets

POLYAMIDE-IMIDE FILM AND PREPARATION METHOD THEREOF

CROSS-REFERENCE TO RELATED APPLICATIONS

This application is a division of U.S. patent application Ser. No. 16/262,472 filed on Jan. 30, 2019, which claims benefits of priority of Korean Patent Application No. 10-2018-0011753 filed on Jan. 31, 2018. The disclosure of each of the foregoing application is incorporated herein by reference in its entirety.

TECHNICAL FIELD

Embodiments relate to a polyamide-imide film that is excellent in mechanical properties and optical properties and that especially secures excellent tensile toughness and elastic restoring force, and a process for preparing the same.

BACKGROUND ART OF THE INVENTION

Since polyamide-imide (PAI) is excellent in resistance to friction, heat, and chemicals, it is employed in such applications as primary electrical insulation, coatings, adhesives, resins for extrusion, heat-resistant paintings, heat-resistant boards, heat-resistant adhesives, heat-resistant fibers, heat-resistant films, and the like.

Polyamide-imide is used in various fields. For example, polyamide-imide is made in the form of a powder and used as a coating for a metal or a magnetic wire. It is mixed with other additives depending on the application thereof. In addition, polyamide-imide is used together with a fluoropolymer as a painter for decoration and corrosion prevention. It also plays a role of bonding a fluoropolymer to a metal substrate. In addition, polyamide-imide is used to coat kitchenware, used as a membrane for gas separation by virtue of its heat resistance and chemical resistance, and used in natural gas wells for filtration of such contaminants as carbon dioxide, hydrogen sulfide, and impurities.

In recent years, polyamide-imide has been developed in the form of a film, which is less expensive and has excellent optical, mechanical, and thermal characteristics.

DISCLOSURE OF THE INVENTION

Problem to be Solved

An embodiment aims to provide a polyamide-imide film that is excellent in mechanical properties and optical properties and that especially secures excellent tensile toughness and elastic restoring force.

In addition, another embodiment aims to provide a process for preparing a polyamide-imide film that secures excellent tensile toughness and elastic restoring force.

Solution to the Problem

The polyamide-imide film according to an embodiment comprises a polyamide-imide polymer formed by polymerizing a diamine compound, a dianhydride compound, and a dicarbonyl compound, wherein the area value up to the yield point derived by the 0.2% off-set method on a stress-strain curve of the polyamide-imide film as measured using a universal testing machine (UTM) is 80 to 150 J/m$^2$.

The process for preparing a polyamide-imide film according to another embodiment comprises simultaneously or sequentially mixing and reacting a diamine compound, a dianhydride compound, and a dicarbonyl compound in an organic solvent in a polymerization apparatus to prepare a polymer solution; transferring the polymer solution to a tank; casting the polymer solution in the tank and then drying it to prepare a gel-sheet; thermally treating the gel-sheet, while it is moved on a belt, to prepare a cured film; and winding the cured film using a winder, wherein the ratio of the moving speed of the gel-sheet on the belt at the time of thermal treatment to the moving speed of the cured film at the time of winding is 1:0.95 to 1:1.40.

Advantageous Effects of the Invention

The polyamide-imide film according to the embodiments is excellent in mechanical properties and optical properties and is especially capable of securing excellent tensile toughness and elastic restoring force.

The process for preparing a polyamide-imide film according to the embodiments is capable of providing a polyamide-imide film that secures excellent tensile toughness and elastic restoring force.

DETAILED DESCRIPTION FOR CARRYING OUT THE INVENTION

Figure 1:
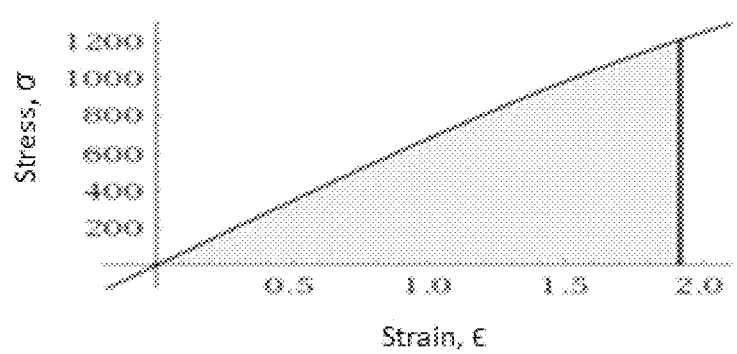
FIG. 1 shows a stress-strain curve of the polyamide-imide film according to Example 1.
Figure 2:
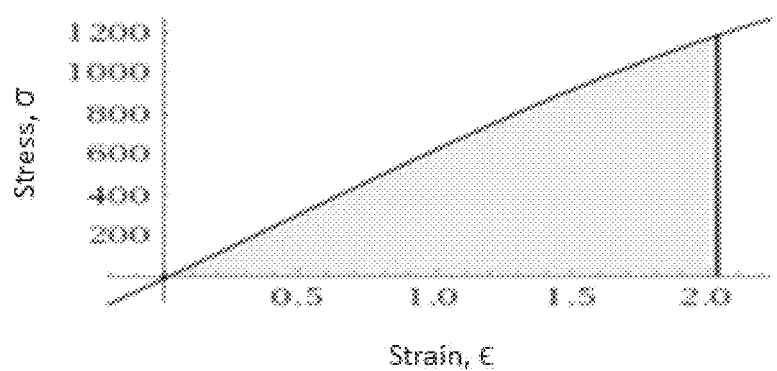
FIG. 2 shows a stress-strain curve of the polyamide-imide film according to Example 2.
Figure 3:
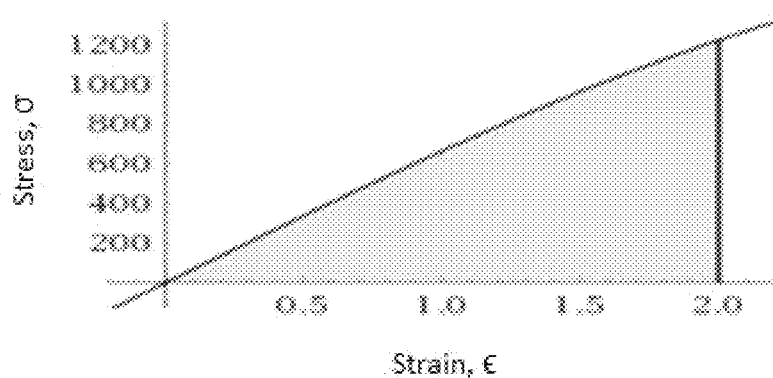
FIG. 3 shows a stress-strain curve of the polyamide-imide film according to Example 3.
Figure 4:
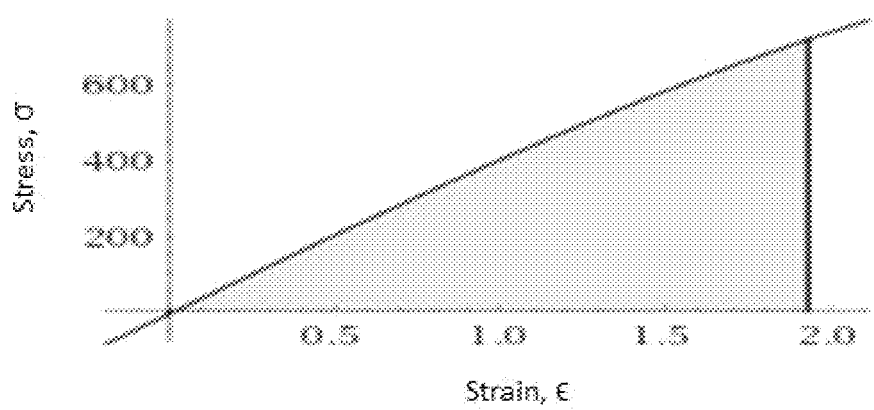
FIG. 4 shows a stress-strain curve of the polyamide-imide film according to Comparative Example 1.
Figure 5:
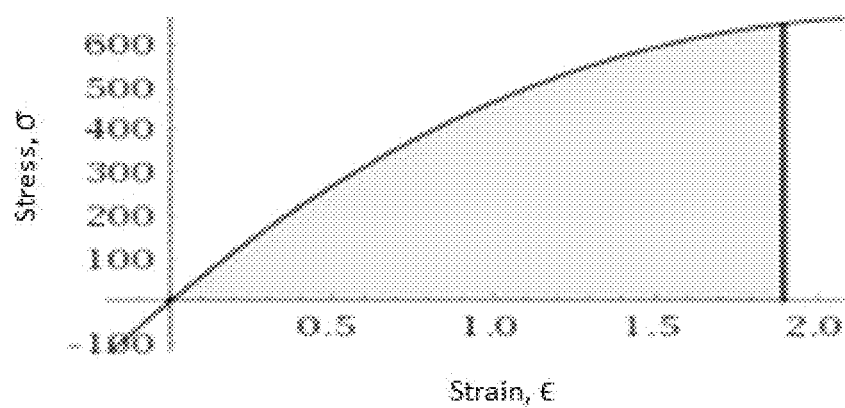
FIG. 5 shows a stress-strain curve of the polyamide-imide film according to Comparative Example 2.
Figure 6:
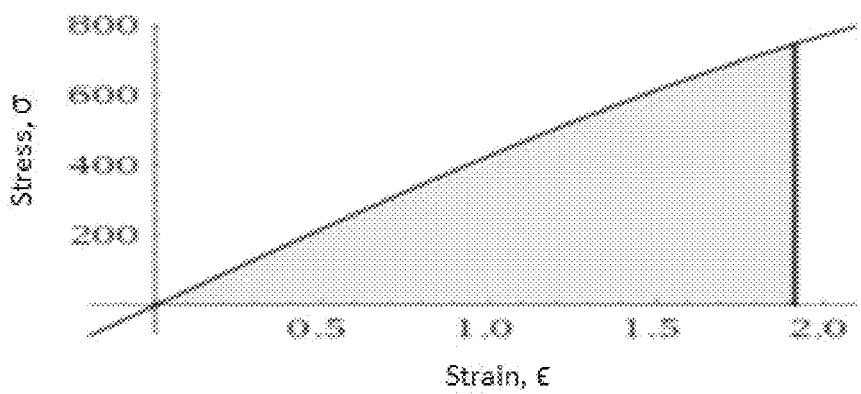
FIG. 6 shows a stress-strain curve of the polyamide-imide film according to Comparative Example 3.

Hereinafter, the present invention is described in detail with reference to embodiments. The embodiments are not limited to those disclosed below. Rather, they may be modified into various forms as long as the gist of the invention is not altered.

In order to clearly illustrate the various layers and regions in the drawings, some regions or some thicknesses are enlarged. In the drawings, for the convenience of explanation, the thicknesses of some layers and regions are exaggerated. Same reference numerals refer to the same elements throughout the specification.

In this specification, when a part is referred to as "comprising" an element, it is to be understood that the part may comprise other elements as well, unless otherwise indicated.

In addition, all numbers and expression related to the quantities of components, reaction conditions, and the like used herein are to be understood as being modified by the term "about," unless otherwise indicated.

The terms first, second, and the like are used herein to describe various elements, and the elements should not be limited by the terms. The terms are used only for the purpose of distinguishing one element from another.

In addition, the term "substituted" as used herein means to be substituted with at least one substituent group selected from the group consisting of deuterium, —F, —Cl, —Br, —I, a hydroxyl group, a cyano group, a nitro group, an amino group, an amidino group, a hydrazine group, a hydrazone group, an ester group, a ketone group, a carboxyl group, a substituted or unsubstituted alkyl group, a substituted or unsubstituted alkenyl group, a substituted or unsubstituted alkynyl group, a substituted or unsubstituted alkoxy group, a substituted or unsubstituted alicyclic organic group, a substituted or unsubstituted heterocyclic group, a substituted or unsubstituted aryl group, and a substituted or unsubstituted heteroaryl group. The substituent groups enumerated above may be connected to each other to form a ring.

<Polyamide-Imide Film>

An embodiment provides a polyamide-imide film that is excellent in mechanical properties and optical properties and that especially secures excellent tensile toughness and elastic restoring force.

The polyamide-imide film according to an embodiment comprises a polyamide-imide polymer formed by polymerizing a diamine compound, a dianhydride compound, and a dicarbonyl compound.

The polyamide-imide polymer comprises an imide repeat unit derived from the polymerization of the diamine compound and the dianhydride compound and amide repeat units derived from the polymerization of the diamine compound and the dicarbonyl compound.

The diamine compound is a compound that forms an imide bond with the dianhydride compound and forms an amide bond with the dicarbonyl compound, to thereby form a copolymer.

The diamine compound is not particularly limited, but it may be, for example, an aromatic diamine compound that contains an aromatic structure. For example, the diamine compound may be a compound represented by the following Formula 1.

$$H_2N-(E)_e-NH_2 \quad \text{[Formula 1]}$$

In the above Formula 1,

E may be selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

e is selected from integers of 1 to 5. When e is 2 or more, E may be the same as, or different from, each other.

(E)$_e$ in the above Formula 1 may be selected from the groups represented by the following Formulae 1-1a to 1-14a.

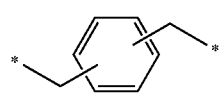

1-1a

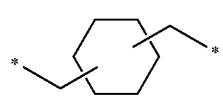

1-2a

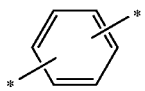

1-3a

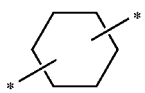

1-4a

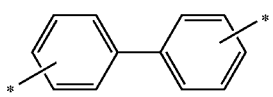

1-5a

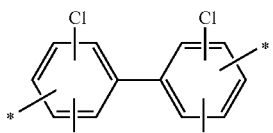

1-6a

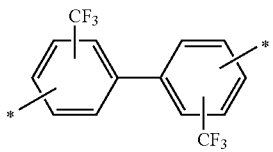

1-7a

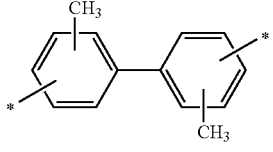

1-8a

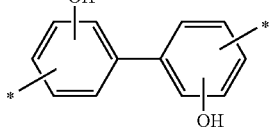

1-9a

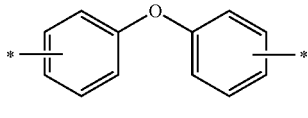

1-10a

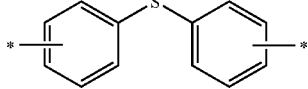

1-11a

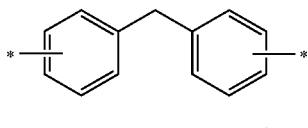

1-12a

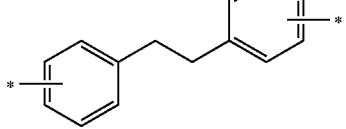

1-13a

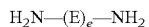

1-14a (n is selected from integers of 1 to 12)

Specifically, $(E)_e$ in the above Formula 1 may be selected from the groups represented by the following Formulae 1-1b to 1-13b, but it is not limited thereto.

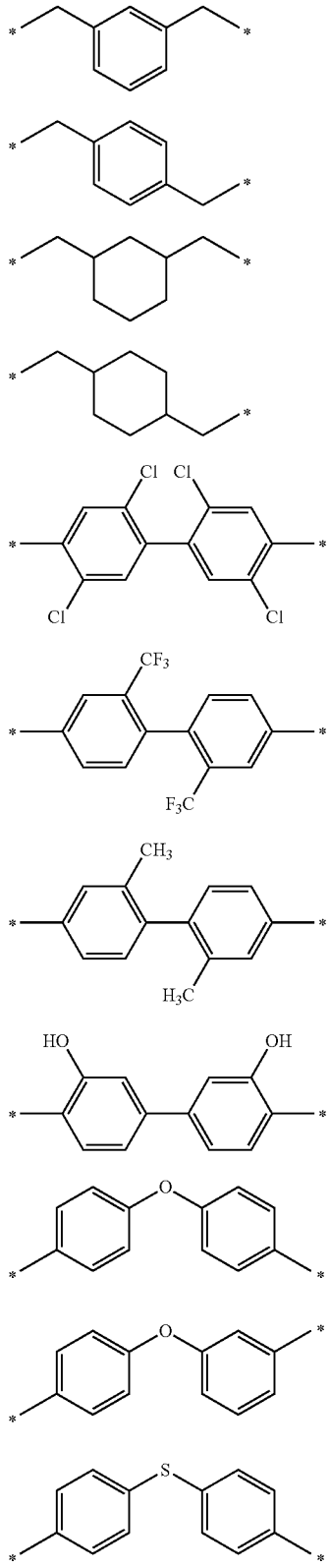

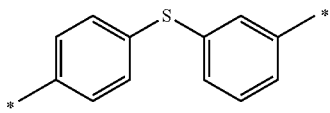

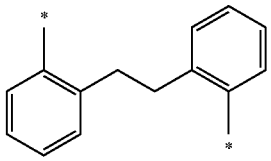

More specifically, $(E)_e$ in the above Formula 1 may be the group represented by the above Formula 1-6b.

In an embodiment, the dianhydride compound may comprise a compound having a fluorine-containing substituent. Alternatively, the dianhydride compound may be composed of a compound having a fluorine-containing substituent. In such event, the fluorine-containing substituent may be a fluorinated hydrocarbon group and specifically may be a trifluoromethyl group. But it is not limited thereto.

In another embodiment, one kind of diamine compound may be used as the diamine compound. That is, the diamine compound may be composed of a single component.

For example, the diamine compound may comprise 2,2'-bis(trifluoromethyl)-4,4'-diaminobiphenyl (TFDB) represented by the following formula, but it is not limited thereto.

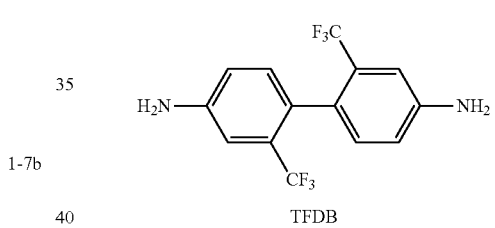

TFDB

The dianhydride compound is a compound that has a low birefringence value, so that it can contribute to enhancements in the optical properties such as transmittance of the polyamide-imide film.

The dianhydride compound is not particularly limited, but it may be, for example, an aromatic dianhydride compound that contains an aromatic structure. For example, the aromatic dianhydride compound may be a compound represented by the following Formula 2.

[Formula 2]

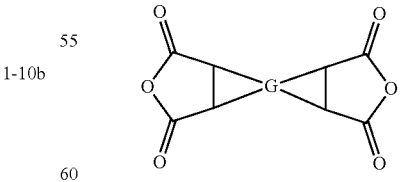

In the above Formula 2,

G is bonded by a bonding group selected from a substituted or unsubstituted tetravalent $C_6$-$C_{30}$ aliphatic cyclic group, a substituted or unsubstituted tetravalent $C_4$-$C_{30}$ heteroaliphatic cyclic group, a substituted or unsubstituted tetravalent $C_6$-$C_{30}$ aromatic cyclic group, a substituted or unsubstituted tetravalent $C_4$-$C_{30}$ heteroaromatic cyclic group, wherein the aliphatic cyclic group, the heteroaliphatic cyclic group, the aromatic cyclic group, or the heteroaromatic cyclic group may be present alone or may be bonded to each other to form a condensed ring, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

G in the above Formula 2 may be selected from the groups represented by the following Formulae 2-1a to 2-9a, but it is not limited thereto.

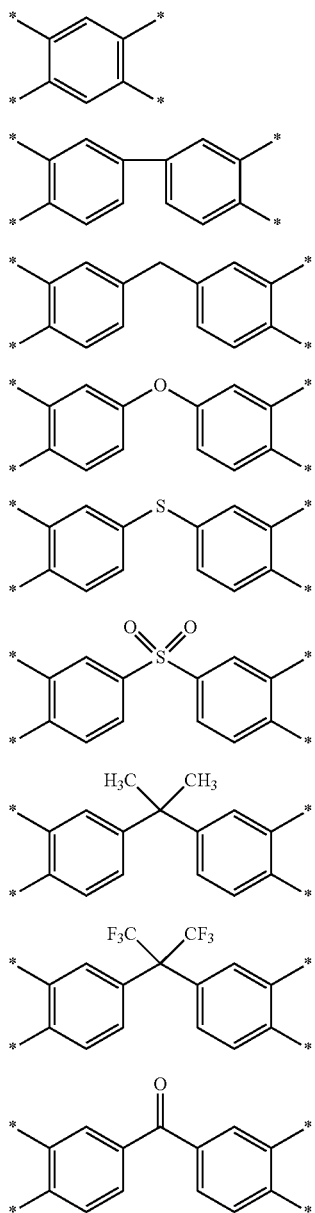

2-1a
2-2a
2-3a
2-4a
2-5a
2-6a
2-7a
2-8a
2-9a

For example, G in the above Formula 2 may be the group represented by the above Formula 2-8a.

In an embodiment, the dianhydride compound may comprise a compound having a fluorine-containing substituent. Alternatively, the dianhydride compound may be composed of a compound having a fluorine-containing substituent. In such event, the fluorine-containing substituent may be a fluorinated hydrocarbon group and specifically may be a trifluoromethyl group. But it is not limited thereto.

In another embodiment, the dianhydride compound may be composed of a single component or a mixture of two components.

For example, the dianhydride compound may comprise 2,2'-bis-(3,4-dicarboxyphenyl) hexafluoropropane dianhydride (6-FDA) represented by the following formula, but it is not limited thereto.

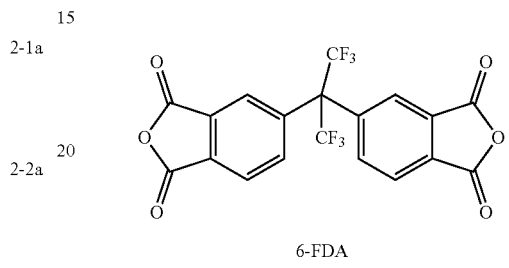

6-FDA

The diamine compound and the dianhydride compound may be polymerized to form a polyamic acid.

Subsequently, the polyamic acid may be converted to a polyimide through a dehydration reaction, and the polyimide comprises an imide repeat unit.

The polyimide may form a repeat unit represented by the following Formula A.

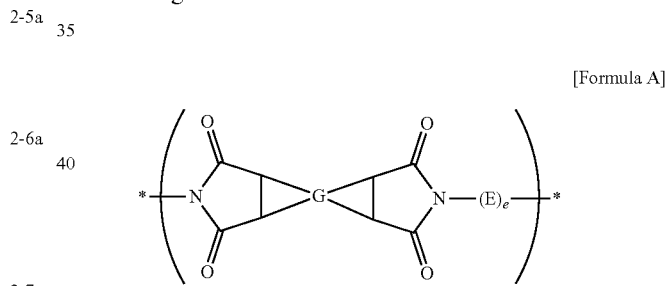

[Formula A]

E, G, and e in the above Formula A are as described above.

For example, the polyimide may comprise a repeat unit represented by the following Formula A-1, but it is not limited thereto.

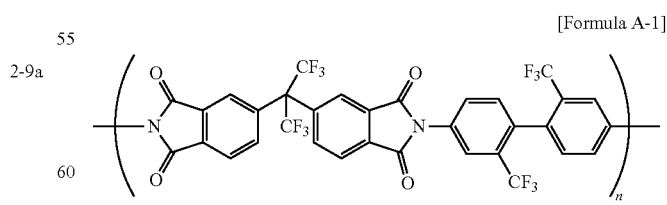

[Formula A-1]

In the above Formula A-1, n is an integer of 1 to 400.

The dicarbonyl compound is not particularly limited, but it may be, for example, a compound represented by the following Formula 3.

[Formula 3]

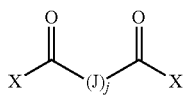

In the above Formula 3,

J may be selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

j is selected from integers of 1 to 5. When j is 2 or more, J may be the same as, or different from, each other.

X is a halogen atom. Specifically, X may be F, Cl, Br, I, or the like. More specifically, X may be Cl, but it is not limited thereto.

(J)$_1$ in the above Formula 3 may be selected from the groups represented by the following Formulae 3-1a to 3-14a, but it is not limited thereto.

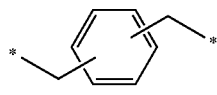
3-1a

3-2a

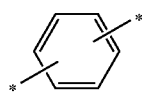
3-3a

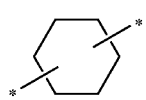
3-4a

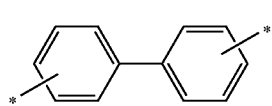
3-5a

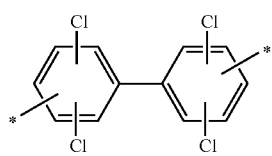
3-6a

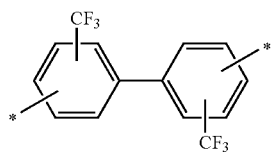
3-7a

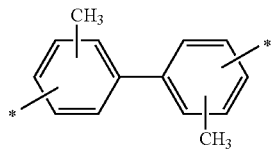
3-8a

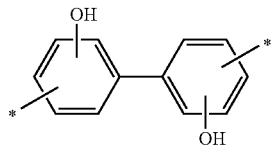
3-9a

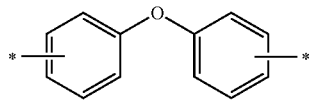
3-10a

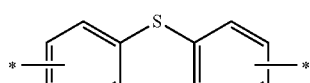
3-11a

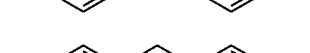
3-12a

3-13a

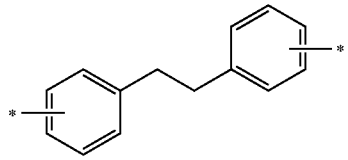
3-14a (n is selected from integers of 1 to 12)

Specifically, (J)$_j$ in the above Formula 3 may be selected from the groups represented by the following Formulae 3-1b to 3-8b, but it is not limited thereto.

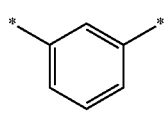
3-1b

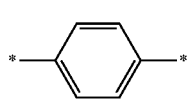
3-2b

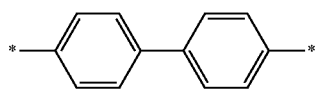
3-3b

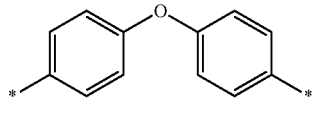
3-4b

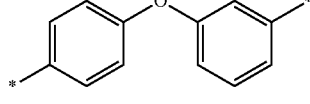
3-5b

-continued

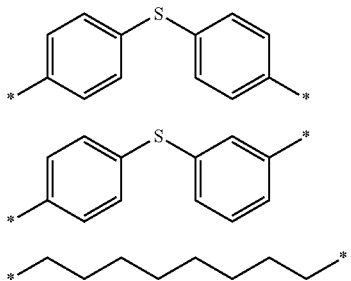

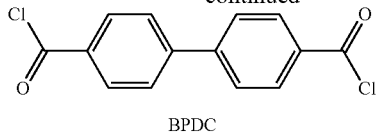

More specifically, $(J)_j$ in the above Formula 3 may be the group represented by the above Formula 3-2b or 3-3b.

In an embodiment, a mixture of at least two kinds of dicarbonyl compounds different from each other may be used as the dicarbonyl compound. If two or more dicarbonyl compounds are used, at least two dicarbonyl compound in which $(J)_j$ in the above Formula 3 is selected from the groups represented by the above Formulae 3-1b to 3-8b may be used as the dicarbonyl compound.

In another embodiment, the dicarbonyl compound may be an aromatic dicarbonyl compound that contains an aromatic structure.

For example, the dicarbonyl compound may comprise a first dicarbonyl compound and/or a second dicarbonyl compound.

The first dicarbonyl compound and the second dicarbonyl compound may be an aromatic dicarbonyl compound, respectively.

The first dicarbonyl compound and the second dicarbonyl compound may be compounds different from each other.

For example, the first dicarbonyl compound and the second dicarbonyl compound may be aromatic dicarbonyl compounds different from each other, but they are not limited thereto.

If the first dicarbonyl compound and the second dicarbonyl compound are an aromatic dicarbonyl compound, respectively, they comprise a benzene ring. Thus, they can contribute to improvements in the mechanical properties such as surface hardness and tensile strength of the polyamide-imide film thus produced.

The dicarbonyl compound may comprise terephthaloyl chloride (TPC), 1,1'-biphenyl-4,4'-dicarbonyl dichloride (BPDC), as represented by the following formulae, or a combination thereof. But it is not limited thereto.

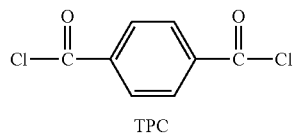

TPC

For example, the first dicarbonyl compound may comprise BPDC, and the second dicarbonyl compound may comprise TPC, but they are not limited thereto.

Specifically, if BPDC is used as the first dicarbonyl compound and TPC is used as the second dicarbonyl compound in a proper combination, the polyamide-imide film thus produced may have high oxidation resistance.

The diamine compound and the dicarbonyl compound may be polymerized to form a repeat unit represented by the following Formula B.

[Formula B]

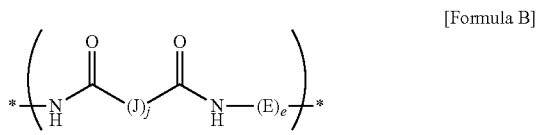

E, J, e, and j in the above Formula B are as described above.

For example, the diamine compound and the dicarbonyl compound may be polymerized to form amide repeat units represented by the following Formulae B-1 and B-2.

[Formula B-1]

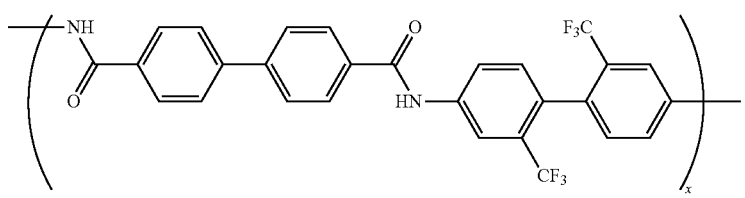

In the above Formula B-1, x is an integer of 1 to 400.

[Formula B-2]

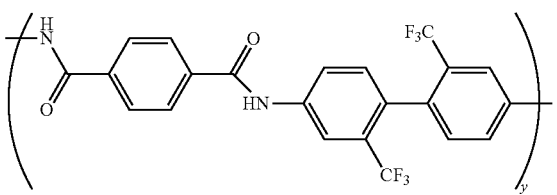

In the above Formula B-2, y is an integer of 1 to 400.

In another embodiment, the polyamide-imide polymer may comprise a repeat unit represented by the following Formula A and a repeat unit represented by the following Formula B:

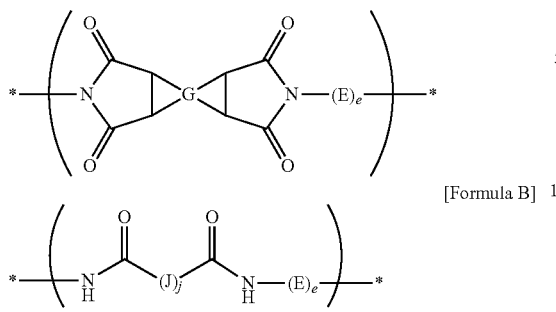

[Formula A]

[Formula B]

E, G, J, e, and j in the above Formulae A and B are as described above.

The polyamide-imide polymer comprises an imide repeat unit and an amide repeat unit. The molar ratio of the imide repeat unit to the amide repeat unit may be 20:80 to 80:20, for example, 20:80 to 50:50. In such event, the imide repeat unit may be a repeat unit represented by the above Formula A, and the amide repeat unit may be a repeat unit represented by the above Formula B.

If the molar ratio satisfies the above range, it is easy to control the viscosity of the polymer solution by using the monomers as described above for preparing the same. As a result, it is easy to produce a uniform film without defects on the surface thereof from the gel-sheet and the cured film. In addition, it is possible to produce a film that secures excellent tensile toughness and elastic restoring force.

In an embodiment, the area value up to the yield point derived by the 0.2% off-set method on a stress-strain curve of the polyamide-imide film as measured using a universal testing machine (UTM) is 80 to 150 $J/m^2$.

Specifically, the area value up to the yield point derived by the 0.2% off-set method on a stress-strain curve of the polyamide-imide film as measured using a universal testing machine (UTM) may be 100 to 140 $J/m^2$, 110 to 130 $J/m^2$, or 120 to 130 $J/m^2$, but it is not limited thereto.

The area up to the yield point refers to the area of the elastic region, which stands for a measure of how well the material can store energy prior to plasticization. The larger the area value of the elastic region, the greater the resistance to plasticization and impact failure, which indicates that the material is well restored upon deformation.

In an embodiment, the polyamide-imide film has a modulus of 5.0 GPa or more when measured at room temperature. Specifically, the modulus may be 5 GPa to 10 GPa, 6 GPa to 10 GPa, or 7 to 10 GPa.

In an embodiment, the polyamide-imide film has a surface hardness of HB or higher. Specifically, the surface hardness may be H or higher, or 2H or higher, but it is not limited thereto.

In an embodiment, the polyamide-imide film has a yellow index of 5 or less. Specifically, the yellow index may be 4.5 or less. More specifically, the yellow index may be 4 or less, but it is not limited thereto.

In an embodiment, the polyamide-imide film has a haze of 2% or less. Specifically, the haze may be 1.8% or less or 1.5% or less. More specifically, the haze may be 1.0% or less or 0.9% or less, but it is not limited thereto.

In an embodiment, the polyamide-imide film has a light transmittance measured at 550 nm of 85% or more. Specifically, the light transmittance measured at 550 nm may be 86% or more, 87% or more, or 88% or more, but it is not limited thereto.

In an embodiment, the polyamide-imide film may have a restoration angle of 60° or more at the time of evaluating the folding restoring force. Specifically, the restoration angle may be 60° to 180°, 60° to 150°, 60° to 120°, 60° to 90°, 60° to 80°, or 60° to 70°, but it is not limited thereto.

The restoration angle at the time of evaluating the folding restoring force refers to the angle at which the film bent and inserted between zigs of a 5 mm interval is restored after 24 hours under the conditions of 85° C. and 85% RH.

In an embodiment, the polyamide-imide film has a tensile strength of 15 $kgf/mm^2$ or more. Specifically, the tensile strength may be 18 $kgf/mm^2$ or more, 20 $kgf/mm^2$ or more, 21 $kgf/mm^2$ or more, or 22 $kgf/mm^2$ or more, but it is not limited thereto.

In an embodiment, the polyamide-imide film has an elongation of 15% or more. Specifically, the elongation may be 16% or more, 17% or more, or 17.5% or more, but it is not limited thereto.

The physical properties of the polyamide-imide film as described above are based on a thickness of 40 μm to 60 μm. For example, the physical properties of the polyamide-imide film may be based on a thickness of 50 μm.

The various characteristics of the polyamide-imide film as described above may be combined.

The polyamide-imide film is prepared by the preparation process as described below such that it is excellent in optical and mechanical properties. The polyamide-imide film may be applicable to various uses that require flexibility and transparency. For example, the polyamide-imide film may be applied to solar cells, displays, semiconductor devices, sensors, and the like.

<Process for Preparing a Polyamide-Imide Film>

The process for preparing a polyamide-imide film according to an embodiment comprises simultaneously or sequentially mixing and reacting a diamine compound, a dianhydride compound, and a dicarbonyl compound in an organic solvent in a polymerization apparatus to prepare a polymer solution; transferring the polymer solution to a tank; casting the polymer solution in the tank and then drying it to prepare a gel-sheet; thermally treating the gel-sheet, while it is moved on a belt, to prepare a cured film; and winding the cured film using a winder.

The polyamide-imide film is a film that comprises a polyamide-imide resin as a main component. The polyamide-imide resin is a resin that comprises, as a structural unit, an amide repeat unit and an imide repeat unit at a predetermined molar ratio.

In the process for preparing a polyamide-imide film, a polymer solution for preparing the polyamide-imide resin is prepared by simultaneously or sequentially mixing and reacting a diamine compound, a dianhydride compound, and a dicarbonyl compound in an organic solvent in a polymerization apparatus.

In an embodiment, the polymer solution may be prepared by simultaneously mixing and reacting the diamine compound, the dianhydride compound, and the dicarbonyl compound in an organic solvent.

In another embodiment, the step of preparing the polymer solution may comprise first mixing and reacting the diamine compound and the dianhydride compound to produce a polyamic acid (PAA) solution; and second mixing and reacting the polyamic acid (PAA) solution and the dicarbonyl compound to form an amide bond and an imide bond at the same time. The polyamic acid solution is a solution that comprises a polyamic acid.

In still another embodiment, the step of preparing the polymer solution may comprise first mixing and reacting the diamine compound and the dianhydride compound to produce a polyamic acid solution; subjecting the polyamic acid solution to dehydration to produce a polyimide (PI) solution; and second mixing and reacting the polyimide (PI) solution and the dicarbonyl compound to further form an amide bond. The polyimide solution is a solution that comprises a polymer having an imide repeat unit.

In still another embodiment, the step of preparing the polymer solution may comprise first mixing and reacting the diamine compound and the dicarbonyl compound to produce a polyamide (PA) solution; and second mixing and reacting the polyamide (PA) solution and the dianhydride compound to further form an imide bond. The polyamide solution is a solution that comprises a polymer having an amide repeat unit.

The polymer solution thus prepared may be a solution that comprises a polymer containing at least one selected from the group consisting of a polyamic acid (PAA) repeat unit, a polyamide (PA) repeat unit, and a polyimide (PI) repeat unit.

Alternatively, the polymer comprised in the polymer solution may comprise an imide repeat unit derived from the polymerization of the diamine compound and the dianhydride compound and an amide repeat unit derived from the polymerization of the diamine compound and the dicarbonyl compound.

In an embodiment, the step of preparing the polymer solution may further comprise introducing a catalyst.

The catalyst may include, for example, beta picoline or acetic anhydride, but it is not limited thereto. The further addition of the catalyst may expedite the reaction rate and enhance the chemical bonding force between the repeat units or that within the repeat units.

In an embodiment, the step of preparing the polymer solution may further comprise adjusting the viscosity of the polymer solution.

Specifically, the step of preparing the polymer solution may comprise (a) simultaneously or sequentially mixing and reacting a diamine compound, a dianhydride compound, and a dicarbonyl compound in an organic solvent to prepare a first polymer solution; (b) measuring the viscosity of the first polymer solution and evaluating whether the target viscosity has been reached; and (c) if the viscosity of the first polymer solution does not reach the target viscosity, further adding the dicarbonyl compound to prepare a second polymer solution having the target viscosity.

The target viscosity may be about 100,000 cps to about 500,000 cps at room temperature. Specifically, the target viscosity may be about 100,000 cps to about 400,000 cps, about 100,000 cps to about 350,000 cps, or about 100,000 cps to about 300,000 cps, but it is not limited thereto.

In another embodiment, the content of solids contained in the polymer solution may be 10% by weight to 20% by weight. Specifically, the content of solids contained in the second polymer solution may be 12% by weight to 18% by weight, but it is not limited thereto.

If the content of solids contained in the polymer solution is within the above range, a polyamide-imide film can be effectively produced in the extrusion and casting steps. In addition, the polyamide-imide film thus produced may have mechanical properties in terms of an improved modulus and the like and optical properties in terms of a low yellow index and the like.

In an embodiment, the step of preparing the polymer solution may further comprise adjusting the pH of the polymer solution. In this step, the pH of the polymer solution may be adjusted to about 4 to about 7, for example about 4.5 to about 7.

The pH of the polymer solution may be adjusted by adding a pH adjusting agent. The pH adjusting agent is not particularly limited and may include, for example, amine compounds such as alkoxyamine, alkylamine, and alkanolamine.

If the pH of the polymer solution is adjusted to the above range, it is possible to prevent the damage to the equipment in the subsequent process, to prevent the occurrence of defects in the film produced from the polymer solution, and to achieve the desired optical properties and mechanical properties in terms of yellow index and modulus.

The pH adjusting agent may be employed in an amount of about 0.1% by mole to about 10% by mole based on the total number of moles of monomers in the polymer solution.

The step of preparing the polymer solution may further comprise purging the polymer solution with an inert gas. The step of purging the polymer solution with an inert gas may remove moisture, reduce impurities, and increase the reaction yield.

In such event, the inert gas may be at least one selected from the group consisting of nitrogen, helium (He), neon (Ne), argon (Ar), krypton (Kr), xenon (Xe), and radon (Rn), but it is not limited thereto. Specifically, the inert gas may be nitrogen.

The molar ratio of the dianhydride compound to the dicarbonyl compound used to prepare the polymer solution may be 20:80 to 80:20, for example, 20:80 to 50:50. If the dianhydride compound and the dicarbonyl compound are employed in the above molar ratio, it is advantageous to achieve the desired mechanical and optical properties of the polyamide-imide film prepared from the polymer solution.

The polymer solution is a solution that comprises a polyamide-imide polymer.

The diamine compound, the dianhydride compound, the dicarbonyl compound, and the polyamide-imide polymer are as described above.

According to another embodiment, the polymer solution may comprise a polyamide-imide polymer formed by polymerizing a diamine compound, a dianhydride compound, and a dicarbonyl compound, wherein the diamine compound may comprise one kind of diamine compound, the dianhydride compound may comprise one kind of dianhydride compound, and the dicarbonyl compound may comprise two kinds of dicarbonyl compound.

Alternatively, the diamine compound may be composed of one kind of diamine compound, the dianhydride compound may be composed of one kind of dianhydride compound, and the dicarbonyl compound may be composed of two kinds of dicarbonyl compound.

As described above, the polyamide-imide resin, which is a main component of the polyamide-imide film, is a resin that comprises, as a structural unit, an amide repeat unit and an imide repeat unit at a predetermined molar ratio.

It is possible to produce a polyamide-imide film whose optical characteristics, mechanical properties, and flexibility are improved in a well-balanced manner without a complicated process by properly controlling the content of the imide repeat unit and that of the amide repeat unit. In addition, it is possible to provide a polyamide-imide film whose optical characteristics, mechanical properties, and flexibility are improved in a well-balanced manner without such steps as precipitation, filtration, drying, and redissolution as adopted in the prior art. The content of the imide repeat unit and that of the amide repeat unit may be controlled by the amounts of the dianhydride and the dicarbonyl compound, respectively.

The imide repeat unit and the amide repeat unit are as described above.

The organic solvent may be at least one selected from the group consisting of dimethylformamide (DMF), dimethylacetamide (DMAc), N-methyl-2-pyrrolidone (NMP), m-cresol, tetrahydrofuran (THF), and chloroform. Specifically, in an embodiment, the organic solvent employed in the polymerization solution may be dimethylacetamide (DMAc), but it is not limited thereto.

Next, after the step of preparing the polymer solution, the polymer solution is transferred to a tank.

Figure 7:
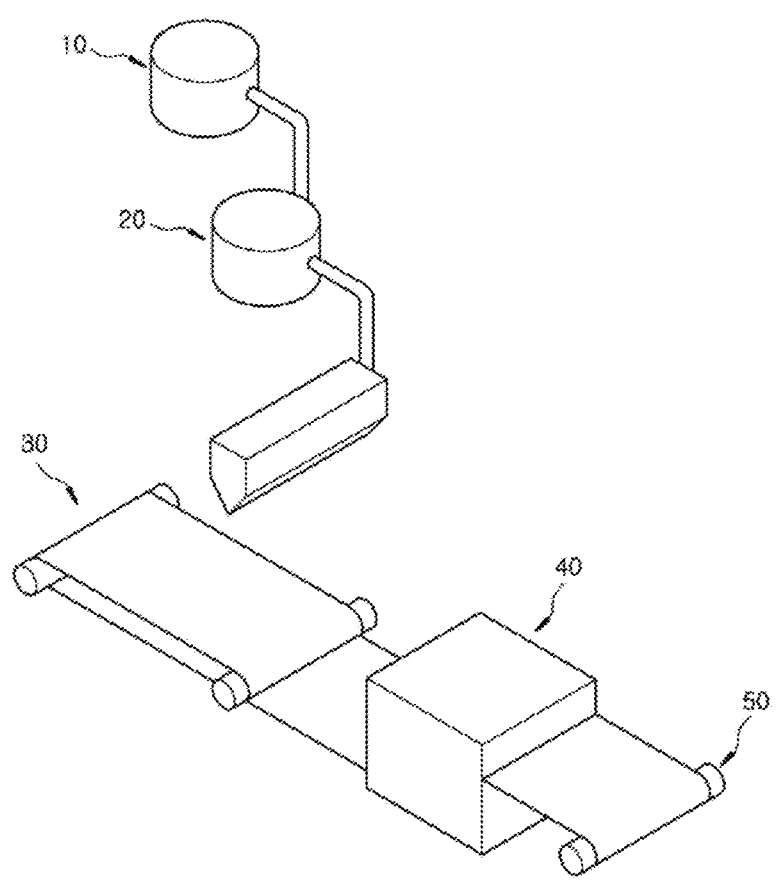
FIG. 7 schematically illustrates a process facility for preparing a polyamide-imide film according to an embodiment.

FIG. 7 schematically illustrates a process facility for preparing a polyamide-imide film according to an embodiment. Referring to FIG. 7, the polymer solution as described above is prepared in a polymerization apparatus (10), and the polymer solution thus produced is transferred to, and stored, in a tank (20).

Here, once the polymer solution is prepared, the step of transferring the polymer solution to the tank is carried out without any additional steps. Specifically, the polymer solution prepared in the polymerization apparatus is transferred to, and stored in, the tank without any separate precipitation and redissolution steps for removing impurities. In the conventional process, in order to remove impurities such as hydrochloric acid (HCl) generated during the preparation of a polymer solution, the polymer solution thus prepared is purified through a separate step to remove the impurities, and the purified polymer solution is then redissolved in a solvent. In this case, however, there has been a problem that the loss of the active ingredient increases in the step of removing the impurities, resulting in decreases in the yield.

Accordingly, the preparation process according to an embodiment ultimately minimizes the amount of impurities generated in the step of preparing the polymer solution or properly controls the impurities in the subsequent steps, even if a certain amount of impurities is present, so as not to deteriorate the physical properties of the final film Thus, the process has an advantage in that a film is produced without separate precipitation or redissolution steps.

The tank (20) is a place for storing the polymer solution before forming it into a film, and its internal temperature may be about −20° C. to about 0° C. If the temperature of the tank (20) is controlled to the above range, it is possible to prevent the polymer solution from deteriorating during storage, and it is possible to lower the moisture content to thereby prevent defects of the film produced therefrom.

The process for preparing a polyamide-imide film may further comprise carrying out vacuum degassing of the polymer solution transferred to the tank (20).

The vacuum degassing may be carried out for 1 hour to 2 hours after depressurizing the internal pressure of the tank to 0.2 to 0.4 bar. The vacuum degassing under these conditions may reduce bubbles in the polymer solution. As a result, it is possible to prevent surface defects of the film produced therefrom and to achieve excellent optical properties such as haze.

In addition, the process for preparing a polyamide-imide film may further comprise purging the polymer solution transferred to the tank (20) with an inert gas.

Specifically, the purging is carried out by purging the tank with an inert gas at an internal pressure of 1 atm to 2 atm. The nitrogen purging under these conditions may reduce bubbles in the polymer solution. As a result, it is possible to prevent surface defects of the film produced therefrom and to achieve excellent optical properties such as haze.

The step of vacuum degassing and the step of purging the tank with nitrogen gas are performed in a separate process, respectively.

For example, the step of vacuum degassing may be carried out, followed by the step of purging the tank with nitrogen gas, but it is not limited thereto.

The step of vacuum degassing and/or the step of purging the tank with nitrogen may improve the physical properties of the surface of the polyamide-imide film thus produced.

Thereafter, the process may further comprise storing the polymer solution in the tank (20) for 12 hours to 60 hours. Here, the temperature inside the tank may be kept at about −20° C. to about 0° C.

The process for preparing a polyamide-imide film may further comprise casting the polymer solution in the tank and then drying it to prepare a gel-sheet.

The polymer solution may be cast onto a casting body such as a casting roll or a casting belt.

Referring to FIG. 7, in an embodiment, the polymer solution may be applied onto a casting belt (30) as a casting body, and it is dried, while it is moved, to be made into a sheet in the form of a gel.

When the polymer solution is injected onto the belt (30), the injection amount may be 300 g/min to 700 g/min. If the injection amount of the polymer solution satisfies the above range, the gel-sheet can be uniformly formed to an appropriate thickness.

In addition, the casting thickness of the polymer solution may be about 200 μm to about 700 μm. If the polymer solution is cast to a thickness within the above range, the final film produced after the drying and thermal treatment may have an appropriate and uniform thickness.

The polymer solution is cast and then dried at a temperature of 60° C. to 150° C. for 5 minutes to 60 minutes to prepare a gel-sheet. The solvent of the polymer solution is partially or totally volatilized during the drying to prepare the gel-sheet.

As described above, the viscosity of the polymer solution at room temperature may be 100,000 cps to 500,000 cps, 100,000 cps to 400,000 cps, 100,000 cps to 350,000 cps, or 150,000 cps to 350,000 cps. If the viscosity satisfies the above range, the polymer solution can be cast onto a belt in a uniform thickness without defects.

In an embodiment, the process for preparing a polyamide-imide film comprises thermally treating the gel-sheet, while it is moved on the belt, to prepare a cured film.

Referring to FIG. 7, the thermal treatment of the gel-sheet may be carried out by passing it through a thermosetting device (40).

The thermal treatment of the gel-sheet may be carried out in a temperature range of about 80° C. to about 500° C. at a temperature elevation rate about of 2° C./min to about 80° C./min for about 5 minutes to about 40 minutes. Specifically, the thermal treatment of the gel-sheet may be carried out in a temperature range of about 80° C. to about 470° C. at a temperature elevation rate of about 10° C./min to about 80° C./min for about 5 minutes to about 30 minutes.

In such event, the initial temperature of the thermal treatment of the gel-sheet may be about 80° C. or higher, and the maximum temperature in the thermal treatment may be about 300° C. to about 500° C. For example, the maximum temperature in the thermal treatment may be 350° C. to 500° C., 380° C. to 500° C., 400° C. to 500° C., 410° C. to 480° C., 410° C. to 470° C., or 410° C. to 450° C.

That is, referring to FIG. 7, the inlet temperature of the thermosetting device (40) may be the initial temperature of the thermal treatment, and the temperature of a certain region inside the thermosetting device (40) may be the maximum temperature in the thermal treatment.

The thermal treatment under these conditions may cure the gel-sheet to have appropriate surface hardness and modulus and may secure high light transmittance and low haze of the cured film at the same time.

The process for preparing a polyamide-imide film may further comprise, after the preparation of the cured film by thermal treatment, cooling the cured film while it is moved on a belt.

Referring to FIG. 7, the cooling of the cured film is carried out after it has been passed through the thermosetting device (40). It may be carried out by using a separate cooling chamber (not shown) or by forming an appropriate temperature atmosphere without a separate cooling chamber.

The step of cooling the cured film while it is moved on a belt may comprise a first temperature lowering step of reducing the temperature at a rate of 100° C./min to 1,000° C./min and a second temperature lowering step of reducing the temperature at a rate of 40° C./min to 400° C./min.

In such event, specifically, the second temperature lowering step is performed after the first temperature lowering step. The temperature lowering rate of the first temperature lowering step may be faster than the temperature lowering rate of the second temperature lowering step.

For example, the maximum rate of the first temperature lowering step is faster than the maximum rate of the second temperature lowering step. Or the minimum rate of the first temperature lowering step is faster than the minimum rate of the second temperature lowering steps.

If the step of cooling the cured film is carried in such a multistage manner, it is possible to have the physical properties of the cured film further stabilized and to maintain the optical properties and mechanical properties of the film achieved during the curing step more stably for a long period of time.

The moving speed of the belt for moving the gel-sheet is the same as the moving speed of the belt for moving the cured film.

The process for preparing a polyamide-imide film comprises winding the cooled cured film using a winder.

Referring to FIG. 7, the cooled cured film may be wound by using a roll-shaped winder (50).

In such event, the ratio of the moving speed of the gel-sheet on a belt at the time of thermal treatment to the moving speed of the cured film at the time of winding is 1:0.95 to 1:1.40. Specifically, the ratio of the moving speeds may be 1:0.99 to 1:1.20, 1:0.99 to 1:1.10, or 1:1.10 to 1:1.05, but it is not limited thereto.

If the ratio of the moving speeds is outside the above range, the mechanical properties of the cured film may be impaired, and the flexibility and elastic properties may be deteriorated.

Specifically, the belt (30) for moving the gel-sheet and the cured film is a continuous belt on the same line. The moving speed of the belt (30) may be about 0.1 m/min to about 15 m/min, for example, about 0.5 m/min to about 10 m/min.

In the process for preparing a polyamide-imide film, the thickness variation (%) according to the following Equation 1 may be 3% to 30%, for example, 5% to 20%.

$$\text{Thickness variation}(\%) = (M1 - M2)/M2 \times 100 \quad \text{[Equation 1]}$$

In the above Equation 1, M1 is the thickness (m) of the gel-sheet, and M2 is the thickness (m) of the cooled cured film at the time of winding.

The polyamide-imide film prepared by the above preparation process is excellent in mechanical properties and optical properties. It is possible to impart long-term stable mechanical properties on a substrate that requires flexibility in terms of modulus, elongation, tensile characteristics, and elastic restoring force.

In addition, in the conventional process for preparing a polyamide-imide film, such byproducts as hydrochloric acid (HCl) are generated upon the polymerization reaction. After the separate precipitation, filtration, and drying steps to remove such byproducts, the resultant is dissolved again in a solvent to prepare a composition for the formation of a film. However, when such precipitation, filtration, drying, and redissolution steps are separately carried out, there is a problem that the yield is remarkably lowered. In contrast, in the preparation process according to an embodiment, the polymer solution is not ought to be subjected to the separate precipitation, filtration, drying, and redissolution steps. Since the polymer solution produced in the polymerization step can be directly applied to the casting step, the yield can be remarkably enhanced.

In addition, in the conventional process for preparing a polyamide-imide film, a step of purging with nitrogen gas is adopted in the thermal treatment for the formation of a film in order to secure transparency of the film and prevent yellowing thereof. In contrast, in the preparation process according to an embodiment, it is possible to achieve excellent optical properties even though the nitrogen purging is not carried out in the film formation and thermal treatment steps. Thus, it is possible to eliminate the possibility that impurities are adulterated in the preparation process or that other physical properties than the optical properties may be impaired.

According to another embodiment, there is provided a polyamide-imide film prepared by the process for preparing a polyamide-imide film Here, the polyamide-imide film is as described in the above section of <Polyamide-imide film>.

The properties of the polyamide-imide film as described above are the results materialized by combinations of the chemical and physical properties of the components, which constitute the polyamide-imide film, along with the conditions in each step of the process for preparing the polyamide-imide film as described above.

Hereinafter, the above description will be described in detail by referring to Examples. But the following Examples are intended to illustrate the present invention, and the scope of the Examples is not limited thereto only.

EXAMPLE

For Examples 1 to 3 and Comparative Examples 1 to 3, respective raw material components were prepared according to the composition as shown in Table 1 below.

Examples 1 to 3

A 1 L glass reactor equipped with a temperature-controllable double jacket was charged with 403.2 g of dimethyl acetamide (DMAc) as an organic solvent at 20° C. under a nitrogen atmosphere. Then, 2,2'-bis(trifluoromethyl)-4,4'-diaminobiphenyl (TFDB) as an aromatic diamine was slowly added thereto and dissolved.

Subsequently, while 2,2'-bis(3,4-dicarboxyphenyl) hexafluoropropane dianhydride (6-FDA) as an aromatic dianhydride was slowly added thereto, the mixture was stirred for 1 hour.

Then, 1,1'-biphenyl-4,4'-dicarbonyldichloride (BPDC) as a first dicarbonyl compound was added, followed by stirring the mixture for 1 hour. And terephthaloyl chloride (TPC) as a second dicarbonyl compound was added, followed by stirring the mixture for 1 hour, thereby preparing a first polymer solution.

The viscosity of the first polymer solution thus prepared was measured. If the measured viscosity did not reach the target viscosity, a TPC solution in a DMAc organic solvent at a concentration of 10% by weight was prepared, and 1 ml of the TPC solution was added to the first polymer solution, followed by stirring the mixture for 30 minutes. This procedure was repeated until the viscosity became about 230,000 cps, thereby preparing a second polymer solution.

The second polymer solution was transferred to a tank and stored at −10° C. The tank was degassed for 1.5 hours, so that the pressure in the tank was about 0.3 bar. Then, the tank was purged with a nitrogen gas at an internal pressure of 1.5 atm. Upon the purging, the second polymer solution was stored in the tank for 48 hours.

Subsequently, the second polymer solution was cast and then dried with hot air at 80° C. for 30 minutes, thereby producing a gel-sheet. Then, the gel-sheet was subjected to thermal treatment in a temperature range of 80° C. to 500° C. at a temperature elevation rate of 2° C./min to 80° C./min for 30 minutes while it was moved on a belt. Thereafter, a first temperature lowering step was carried out by reducing the temperature at a rate of about 800° C./min, followed by a second temperature lowering step by reducing the temperature at a rate of about 100° C./min, thereby obtaining a polyamide-imide film. The film was wound using a winder. In such event, the moving speed of the gel-sheet on the belt at the time of thermal treatment was 1 m/s. The ratio of the moving speed of the gel-sheet on the belt at the time of thermal treatment to the moving speed of the film at the time of winding was adjusted as shown in Table 1 below.

Comparative Example 1

A 1 L glass reactor equipped with a temperature-controllable double jacket was charged with 518.5 g of dimethyl acetamide (DMAc) as an organic solvent at 20° C. under a nitrogen atmosphere. Then, 2,2'-bis(trifluoromethyl)-4,4'-diaminobiphenyl (TFDB) as an aromatic diamine was slowly added thereto and dissolved.

Subsequently, while 2,2'-bis(3,4-dicarboxyphenyl) hexafluoropropane dianhydride (6-FDA) as an aromatic dianhydride was slowly added thereto, the mixture was stirred for 1 hour.

Then, terephthaloyl chloride (TPC) as a dicarbonyl compound was added, followed by stirring the mixture for 1 hour, thereby preparing a first polymer solution. The viscosity of the first polymer solution thus prepared was measured. If the measured viscosity did not reach the target viscosity, a TPC solution in a DMAc organic solvent at a concentration of 10% by weight was prepared, and 1 mL of the TPC solution was added to the first polymer solution, followed by stirring the mixture for 30 minutes. This procedure was repeated until the viscosity became 100,000 cps to 300,000 cps, thereby preparing a second polymer solution.

The second polymer solution was processed by the method described in Example 1 to prepare a polyamide-imide film. The ratio of the moving speed of the gel-sheet on the belt at the time of thermal treatment to the moving speed of the film at the time of winding was adjusted as shown in Table 1 below.

Comparative Example 2

A polyamide-imide film was prepared by the same composition and processing method as those of Examples 1 to 3. The ratio of the moving speed of the gel-sheet on the belt at the time of thermal treatment to the moving speed of the film at the time of winding was adjusted as shown in Table 1 below.

Comparative Example 3

A PET film of the brand name SH86 produced by SKC was used.

Evaluation Example

The films of Examples 1 to 3 and Comparative Examples 1 to 3 were each measured and evaluated for the following properties.

Evaluation Example 1: Measurement of Film Thickness

The thickness was measured at 5 points in the width direction using a digital micrometer 547-401 manufactured by Mitutoyo Corporation. Their average value was adopted as the thickness.

Evaluation Example 2: Measurement of Speed Ratio

The speed ratio refers to the ratio of the moving speed of the gel-sheet on the belt at the time of thermal treatment to the moving speed of the cured film at the time of winding. The moving speed of the gel-sheet and that of the cured film were measured using a contact type tachometer MS6208A of Optech.

Evaluation Example 3: Measurement of Modulus

A sample was cut out by at least 5 cm in the direction perpendicular to the main shrinkage direction of the film and by 10 cm in the main shrinkage direction. It was fixed by the clips disposed at intervals of 5 cm in a universal testing machine UTM 5566A of Instron. A stress-strain curve was obtained until the sample was fractured while it was stretched at a rate of 5 mm/min at room temperature. The slope of the load with respect to the initial strain on the stress-strain curve was taken as the modulus (GPa).

Evaluation Example 4: Measurement of 0.2% Off-Set and Area Value of Elastic Region On a stress-strain curve obtained with the UTM 5566A universal testing machine, a parallel line was drawn as moved 0.2% of the strain to the modulus (GPa), which is the slope of the load for the initial strain. The strain value at the point where the line and the stress-strain curve meet is taken as the yield point measured by the 0.2% offset method. The area value of the elastic region was measured as the integral value for the stress-strain curve from the initial strain to the yield point.

Evaluation Example 5: Measurement of Surface Hardness

The surface hardness was measured with a pencil hardness measuring instrument (CT-PC1, CORE TECH, Korea) with a pencil hardness measuring pencil mounted at an angle of 45° and at a pencil speed of 300 mm/min while a constant load (750 g) was applied. The pencil used was Mitsubishi pencils having a strength of H to 9H, F, HB, B to 6B, and the like.

Evaluation Example 6: Measurement of Yellow Index (YI)

The yellow Index (YI) was measured with a spectrophotometer (UltraS can PRO, Hunter Associates Laboratory) using a CIE colorimetric system.

Evaluation Example 7: Measurement of Light Transmittance and Haze (HZ)

The light transmittance at 550 nm and the haze were measured using a haze meter NDH-5000W manufactured by Nippon Denshoku Kogyo.

Evaluation Example 8: Measurement of Restoring Force

The film was bent and inserted between zigs of a 5 mm interval, and the angle was measure when it is restored after 24 hours under the conditions of 85° C. and 85% RH.

TABLE 1

| Item | | Ex. 1 | Ex. 2 | Ex. 3 | C. Ex. 1 | C. Ex. 2 | C. Ex. 3 |
|---|---|---|---|---|---|---|---|
| Molar ratio | TFDB | 0.20 | 0.20 | 0.20 | 0.20 | 0.20 | — |
| | 6FDA | 0.04 | 0.04 | 0.05 | 0.12 | 0.05 | — |
| | TPC | 0.06 | 0.05 | 0.05 | 0.08 | 0.05 | — |
| | BPDC | 0.10 | 0.11 | 0.10 | — | 0.10 | — |
| Thickness (μm) | | 50 | 50 | 50 | 50 | 50 | 50 |
| Speed ratio | | 1:1.01 | 1:1.00 | 1:1.01 | 1:1.5 | 1:0.85 | — |
| Modulus (GPa) | | 7.37 | 7.35 | 7.09 | 4.24 | 5.34 | 4.35 |
| 0.2% off-set (%) | | 1.92 | 2.03 | 2.14 | 1.93 | 1.90 | 1.92 |
| Elastic region (J/m² @ 0.2%) | | 122.3 | 125.3 | 128.5 | 73.2 | 77.3 | 76.5 |
| Surface hardness | | 2H | 2H | 2H | H | H | 6B |
| Yellow index (YI) | | 3.26 | 3.07 | 3.93 | 1.38 | 2.98 | 0.62 |
| Haze (%) | | 0.86 | 0.84 | 0.78 | 0.36 | 0.77 | 1.85 |
| Transmittance (%) | | 88.6 | 88.9 | 89.0 | 90.7 | 88.9 | 89.6 |
| Evaluation of restoring force | | 67° | 64° | 68° | 56° | 59° | 27° |

As can be seen from the above Table 1, in Examples 1 to 3, when compared with Comparative Examples 1 to 3, not only were the mechanical properties and the optical properties excellent, but also it was possible to secure excellent elastic area value and excellent restoration angle at the time of evaluation of restoring force. Thus, it may be applicable to various uses that require flexibility and transparency.

DESCRIPTION OF THE NUMERALS

10: polymerization apparatus
20: tank
30: belt
40: thermosetting device
50: winder

The invention claimed is:

1. A process for preparing a polyamide-imide film, which comprises:
    simultaneously or sequentially mixing and reacting a diamine compound, a dianhydride compound, and a dicarbonyl compound in an organic solvent in a polymerization apparatus to prepare a polymer solution;
    transferring the polymer solution to a tank;
    casting the polymer solution in the tank and then drying it to prepare a gel-sheet;
    thermally treating the gel-sheet, while it is moved on a belt, to prepare a cured film; and
    winding the cured film using a winder,
    wherein the ratio of the moving speed of the gel-sheet on the belt at the time of thermal treatment to the moving speed of the cured film at the time of winding is 1:0.95 to 1:1.40,
    wherein the step of preparing the polymer solution comprises:
    (a) simultaneously or sequentially mixing and reacting a diamine compound, a dianhydride compound, and a dicarbonyl compound in an organic solvent in a polymerization apparatus to prepare a first polymer solution;
    (b) measuring the viscosity of the first polymer solution and evaluating whether the target viscosity is reached; and
    (c) if the viscosity of the first polymer solution does not reach the target viscosity, further adding the dicarbonyl compound to prepare a second polymer solution having the target viscosity.

2. The process for preparing a polyamide-imide film of claim 1, wherein the target viscosity at room temperature is 100,000 cps to 300,000 cps.

3. The process for preparing a polyamide-imide film of claim 1, wherein, once the polymer solution is prepared, the step of transferring the polymer solution to the tank is carried out without any additional steps.

4. The process for preparing a polyamide-imide film of claim 1, wherein the temperature inside the tank is −20° C. to 0° C.

5. The process for preparing a polyamide-imide film of claim 1, which, after the polymer solution is transferred to the tank, further comprises carrying out vacuum degassing; and
    purging the tank with an inert gas.

6. The process for preparing a polyamide-imide film of claim 1, which, after the polymer solution is transferred to the tank, further comprise storing the polymer solution in the tank for 12 hours to 60 hours.

7. The process for preparing a polyamide-imide film of claim 1, wherein the polymer solution is cast and then dried at a temperature of 60° C. to 150° C. for 5 minutes to 60 minutes to prepare a gel-sheet.

8. The process for preparing a polyamide-imide film of claim 1, wherein the thermal treatment is carried out in a temperature range of 80° C. to 500° C. at a temperature elevation rate of 2° C./min to 80° C./min for 5 to 40 minutes.

9. The process for preparing a polyamide-imide film of claim 1, which, after the cured film is prepared by thermal treatment, further comprises cooling the cured film while it is moved on a belt.

10. The process for preparing a polyamide-imide film of claim 1, wherein the ratio of the moving speed of the gel-sheet on the belt at the time of thermal treatment to the moving speed of the cured film at the time of winding is 1:0.99 to 1:1.10.

11. The process for preparing a polyamide-imide film of claim 1, wherein the area value up to the yield point derived by the 0.2% off-set method on a stress-strain curve of the polyamide-imide film as measured using a universal testing machine (UTM) is 80 to 150 J/m2.

12. The process for preparing a polyamide-imide film of claim 1, wherein the polyamide-imide film has a modulus of 5.0 GPa or more based on a thickness of 50 μm.

13. The process for preparing a polyamide-imide film of claim 1, wherein the polyamide-imide film has a restoration angle of 60° or more at the time of evaluating the folding restoring force, and the restoration angle at the time of evaluating the folding restoring force refers to the angle at which the film bent and inserted between zigs of a 5 mm interval is restored after 24 hours under the conditions of 85° C. and 85% RH.

\* \* \* \* \*